Patented Jan. 12, 1943

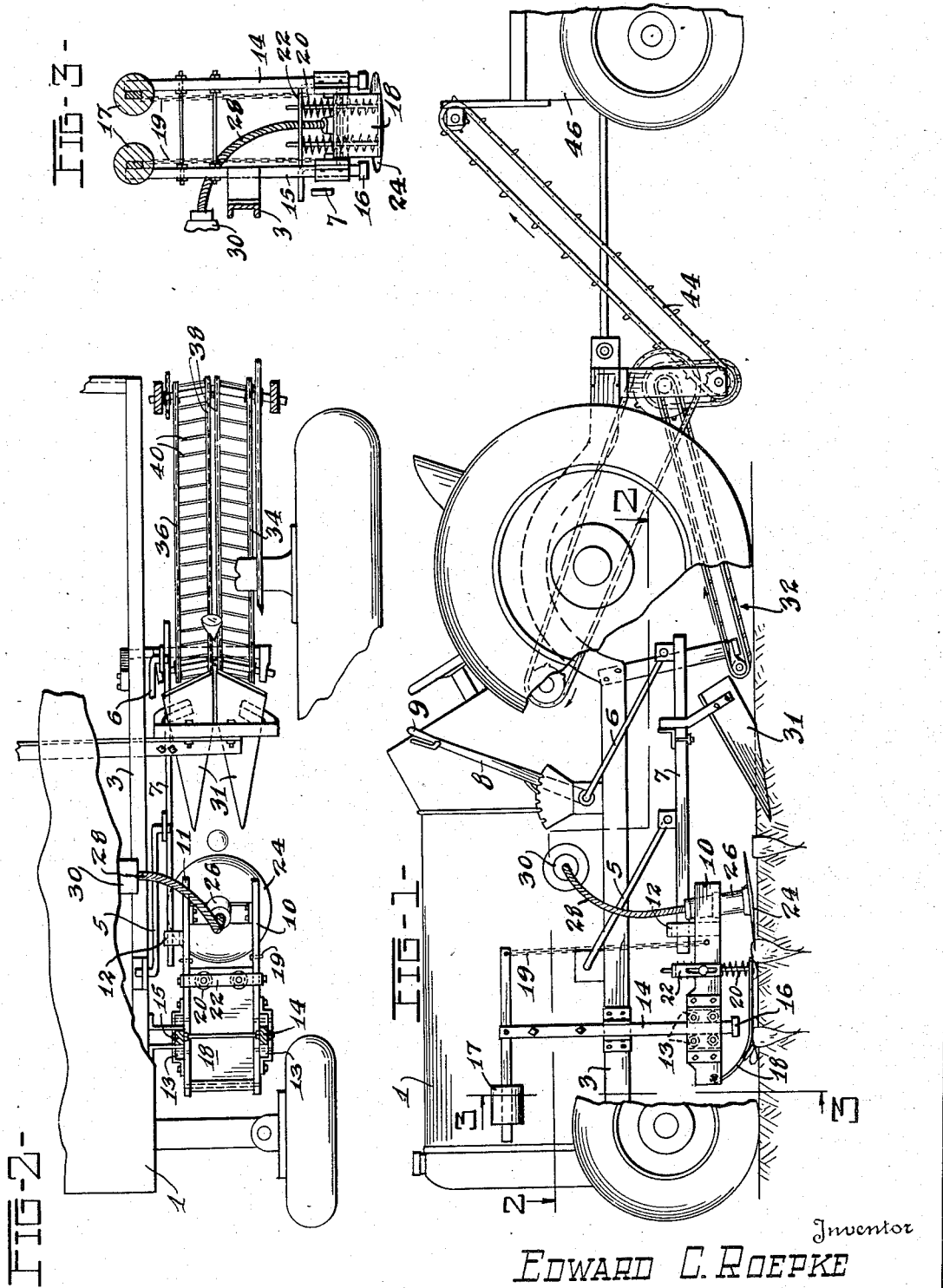

2,308,392

UNITED STATES PATENT OFFICE 2,308,392

BEET HARVESTER

Edward C. Roepke, Elmore, Ohio, assignor of one-fifth to Clarence Krause, Williston, Ohio Application April 9, 1942, Serial No. 438,223

4 Claims. (Cl. 55—9)

This invention relates to harvesting equipment for sugar beets and similar vegetables and is particularly directed to the topping and loading mechanisms used in such equipment.

The primary object of the invention is to provide a simple and inexpensive mechanism to top and plow beets or similar vegetables and to load them into a wagon in a cleaned condition while retaining substantially all of the beet undamaged.

It has heretofore been proposed to provide a sugar beet harvester in which the topping knife was raised or lowered by a shoe which, in turn, was moved vertically by the beets themselves. Such prior constructions, however, have been so heavy and have embodied such elaborate drive mechanisms that they operated unsatisfactorily and inaccurately, frequently destroying the beets by overturning them and slicing the sides thereof rather than the tops. The present invention provides a light, simplified structure which is not apt to get out of order, and which requires but a small moving force for its vertical adjustment.

Other objects and advantages of the invention will become apparent as the description proceeds, reference being had to the accompanying drawing in which:

Fig. 1 is a side elevation, with parts broken away, of the present invention attached to a tractor; Fig. 2 is a section on line 2—2 of Fig. 1; and Fig. 3 is a section on line 3—3 of Fig. 1.

Referring to the drawing the present invention is shown incorporated in an attachment for a tractor which may be of any suitable type. The tractor is provided with a side frame 3 which supports the harvesting unit by means of parallel links 5 and 6 pivoted at their upper ends to the tractor frame and at their lower ends to a cultivator frame 7. The usual drag lever 8 having an operating handle 9 is used to raise and lower the cultivator frame relative to the tractor.

Below the cultivator frame is a counter-balanced movable sub-frame which consists of two spaced, parallel members 10 and 11, one of which carries a hook member 12 for engagement with the cultivator frame during its raising movement. The sub-frame is thus adapted to be raised clear of the ground by the cultivator frame, yet it is independent of the latter when lowered to a certain point. The parallel members 10 and 11 are provided near their front ends with anti-friction guide parts 13 which engage on each side of fixed vertical guide bars 14 and 15. The parts 13 are preferably four spaced rollers journaled on each of the parallel members 10 and 11 comprising the sub-frame and engaging the front and back of the guide bars 14 so as to limit the lateral movements, in both directions, of the sub-frame. The guide bars 14 are further provided with enlargements 16 at their lower ends to limit the downward movements of the members 10 and 11 and the assembly carried thereby. The entire sub-frame and the assemblies carried thereby are counterbalanced by means of a weight 17 pivoted to a post extending upwardly from the tractor side frame and connected to the sub-frame by any suitable means such as a chain 19.

A beet engaging shoe 18 is journaled at its front end to the members 10 and 11 and extends downwardly and rearwardly therefrom to present a suitably curved surface to the line of travel. At its rear end the shoe is biased downwardly by springs 20 confined between it and a yoke 22 which extends between the sides 10 and 11 of the sub-frame. The tension of the springs, and consequently the biasing force may be made adjustable in any suitable manner as by raising or lowering the yoke 22. For this purpose the sides of the yoke are provided with slots at the point of connection with the respective sub-frame members. It will be apparent that the force operating against the beets is determined largely by the adjustment of springs 20.

At the rear end of the sub-frame a topping knife 24 is carried and is preferably of the circular type rotating in a journal 26 rigidly fixed to the sub-frame members 10 and 11. The knife 24 is driven by a flexible shaft 28 which extends upwardly from the journal 26 to a power take-off 30 at the side of the tractor 1. The power take-off is conventional and, therefore, need not be further described.

As the tractor advances, one row of beets is topped by the above described mechanism, the extent of the topping being regulated by the raising or lowering of the sub-frame and hence the topping knife. It will be appreciated that very little force is required to raise the frame part because of the fact that the counterbalancing can be adjusted to a high degree of accuracy, and further, because of the fact that the drive to the topping knife is through a flexible shaft rather than through a complicated and heavy transmission mechanism.

After the beets are topped, it is, of course, necessary to remove them from the ground and load them into a wagon or truck. For this purpose a suitable plow 31 is carried beneath the tractor and consists of facing blades forming a converging surface between which the beets are raised from the ground and presented to a power driven loading and cleaning conveyor 32. The conveyor 32 consists of synchronously driven side chains 34 and 36 each of which connects with a respective sprocket, the sprockets themeselves being driven from a suitable power take-off at the rear of the tractor. Each of the side chains is connected with an inner chain 38 by a series of bars 40 which extend between the links of the respective side chains and the inner chains. The inner chains are spaced from each other slightly to permit the tail of the beet to be engaged between them and since the beet is propelled upwardly by the connecting bars 40 any dirt which might have adhered to the surface of the beet will be effectively removed without damage to the body of the beet itself. If desired the bars 40 may be placed at every link of the chains 34 and 36 in which case no further support for the beets need be provided. However, if desired, certain of the bars 40 may be omitted and a supporting belt or web may be used to give the principal vertical support to the beets, the bars 40 being used solely for propelling and cleaning purposes.

After passing the cleaning conveyor the beets are dropped onto the usual loading conveyor 44 and dumped into a wagon 46 which may be towed by the tractor.

While the invention has been described in connection with a specific form and disposition of the parts, it will be appreciated that various changes in, and reorganization of the elements may be made without departing from the invention as defined in the appended claims.

What I claim as new and desire to secure by United States Letters Patent is:

1. In a machine for harvesting surgar beets or similar vegetables, a tractor having a frame, a cultivator frame carried by said tractor frame, a sub-frame adapted to be lifted by said cultivator frame, a counterbalance weight for said sub-frame pivoted on said tractor frame and connected to said sub-frame, a beet engaging shoe carried by said sub-frame to adjust the height above the ground of said sub-frame by contact with a beet, a topping knife carried by said sub-frame, a flexible drive for said topping knife connected to a power source of said tractor, and means carried by said cultivator frame to elevate beets topped by said knife from the ground and to deliver them to a receptacle.

2. In a machine for harvesting sugar beets or similar vegetables, a tractor having a frame, a cultivator frame carried by said tractor frame, a sub-frame adapted to be lifted by said cultivator frame, a counterbalance weight for said sub-frame pivoted on said tractor frame and connected to said sub-frame, a beet engaging shoe carried by said sub-frame to adjust the height above the ground of said sub-frame by contact with a beet, a topping knife carried by said sub-frame, a flexible drive for said topping knife connected to a power source of said tractor, a plow carried by said cultivator frame to raise topped beets from the ground, and a conveyor to carry plowed beets to a receptacle.

3. In a machine for harvesting sugar beets or similar vegetables, a tractor having a frame, a cultivator frame carried by said tractor frame, a sub-frame adapted to be lifted by said cultivator frame, a counterbalance weight for said sub-frame pivoted on said tractor frame and connected to said sub-frame, a beet engaging shoe carried by said sub-frame to adjust the height above the ground of said sub-frame by contact with a beet, a topping knife carried by said sub-frame, a flexible drive for said topping knife connected to a power source of said tractor, a plow carried by said cultivator frame to raise topped beets from the ground and a conveyor consisting of two spaced pairs of synchronously driven chains and bars connecting said chains in spaced pairs whereby beets propelled over said conveyor are cleaned of adhering dirt and delivered to a receptacle.

4. In a machine for harvesting sugar beets or similar vegetables, a tractor having a frame, a cultivator frame carried by said tractor frame, a sub-frame adapted to be lifted by said cultivator frame, a counterbalance weight for said sub-frame pivoted on said tractor frame and connected to said sub-frame, spaced guide posts fixed to said tractor frame, anti-friction guide rollers carried by said sub-frame and surrounding said guide posts, a beet engaging shoe carried by said sub-frame to adjust the height above the ground of said sub-frame by contact with a beet, a topping knife carried by said sub-frame, a flexible drive for said topping knife connected to a power source of said tractor, and means to elevate beets topped by said knife from the ground and to deliver them to a receptacle.

EDWARD C. ROEPKE.